July 12, 1949.    L. B. EATON    2,475,950
APPARATUS FOR PRODUCING BAGS
Filed Oct. 2, 1945    8 Sheets-Sheet 1

Inventor
Lewis B. Eaton
By J. Stanley Churchill
ATTORNEY

Inventor
Lewis B. Eaton
By J. Stanley Churchill
ATTORNEY

July 12, 1949.    L. B. EATON    2,475,950
APPARATUS FOR PRODUCING BAGS
Filed Oct. 2, 1945    8 Sheets-Sheet 3

Inventor
Lewis B. Eaton
By J. Stanley Churchill
ATTORNEY

July 12, 1949.　　　　　L. B. EATON　　　　　2,475,950
APPARATUS FOR PRODUCING BAGS
Filed Oct. 2, 1945　　　　　　　　　　　　　8 Sheets-Sheet 4

Inventor
Lewis B. Eaton
By J. Stanley Churchill
ATTORNEY

July 12, 1949.    L. B. EATON    2,475,950
APPARATUS FOR PRODUCING BAGS
Filed Oct. 2, 1945    8 Sheets-Sheet 5

Inventor
Lewis B. Eaton
By J. Stanley Churchill.
ATTORNEY

Inventor
Lewis B. Eaton
BY J. Stanley Churchill
ATTORNEY

July 12, 1949.   L. B. EATON   2,475,950
APPARATUS FOR PRODUCING BAGS
Filed Oct. 2, 1945   8 Sheets-Sheet 7

Inventor
Lewis B. Eaton
By J. Stanley Churchill
ATTORNEY

Inventor
Lewis B. Eaton
By J. Stanley Churchill
ATTORNEY

Patented July 12, 1949

2,475,950

UNITED STATES PATENT OFFICE 2,475,950

APPARATUS FOR PRODUCING BAGS

Lewis B. Eaton, Quincy, Mass., assignor to Pneumatic Scale Corporation, Limited, Quincy, Mass., a corporation of Massachusetts Application October 2, 1945, Serial No. 619,823

4 Claims. (Cl. 93—3)

1

This invention relates to apparatus for producing bags.

The invention has for an object to provide a novel and improved construction of apparatus for simultaneously making and filling a plurality of bags, particularly paper tea bags, during each cycle of operation in an efficient, economical, rapid and practical manner.

With this general object in view, and such others as may hereinafter appear, the invention consists in the apparatus for producing bags and in the various structures, arrangements and combinations of parts hereinafter described and particularly defined in the claims at the end of this specification.

In the drawings illustrating the preferred embodiment of the invention, Fig. 2 is a detail plan view of web guiding means to be hereinafter referred to.

In general, the present invention contemplates novel apparatus for making individual bags, such as tea bags from an elongated web or strip of bag forming material in accordance with the method disclosed in the United States Patent to Patterson, No. 2,272,530, issued February 10, 1942, and, in general, comprises an improvement on the apparatus disclosed in the United States Patent to Patterson, No. 2,385,229. The apparatus herein disclosed is particularly designed as a high production capacity machine and includes a plurality of mechanisms for simultaneously performing the various operations upon a plurality of and at least two of such bag forming strips.

Figures 1, 2:
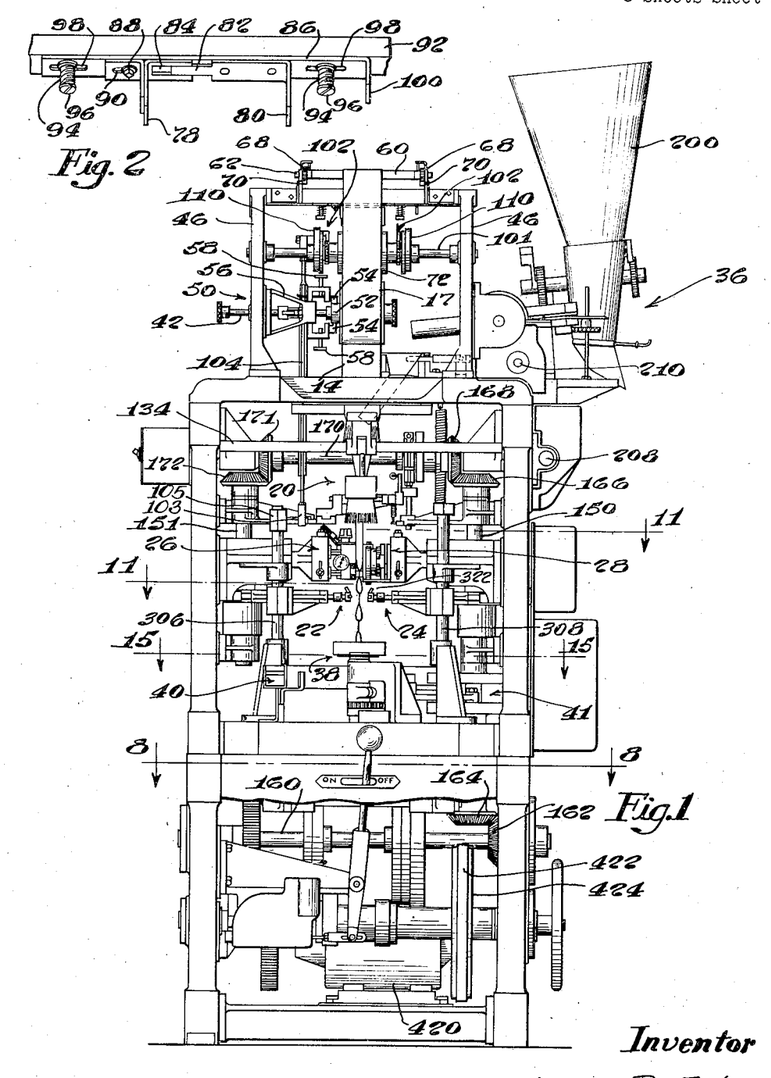
Figure 1:
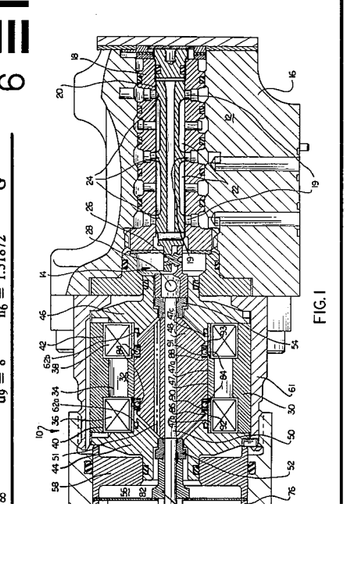
Fig. 1 is a front elevation of a tea bagging machine embodying the present invention.
Figures 3, 4:
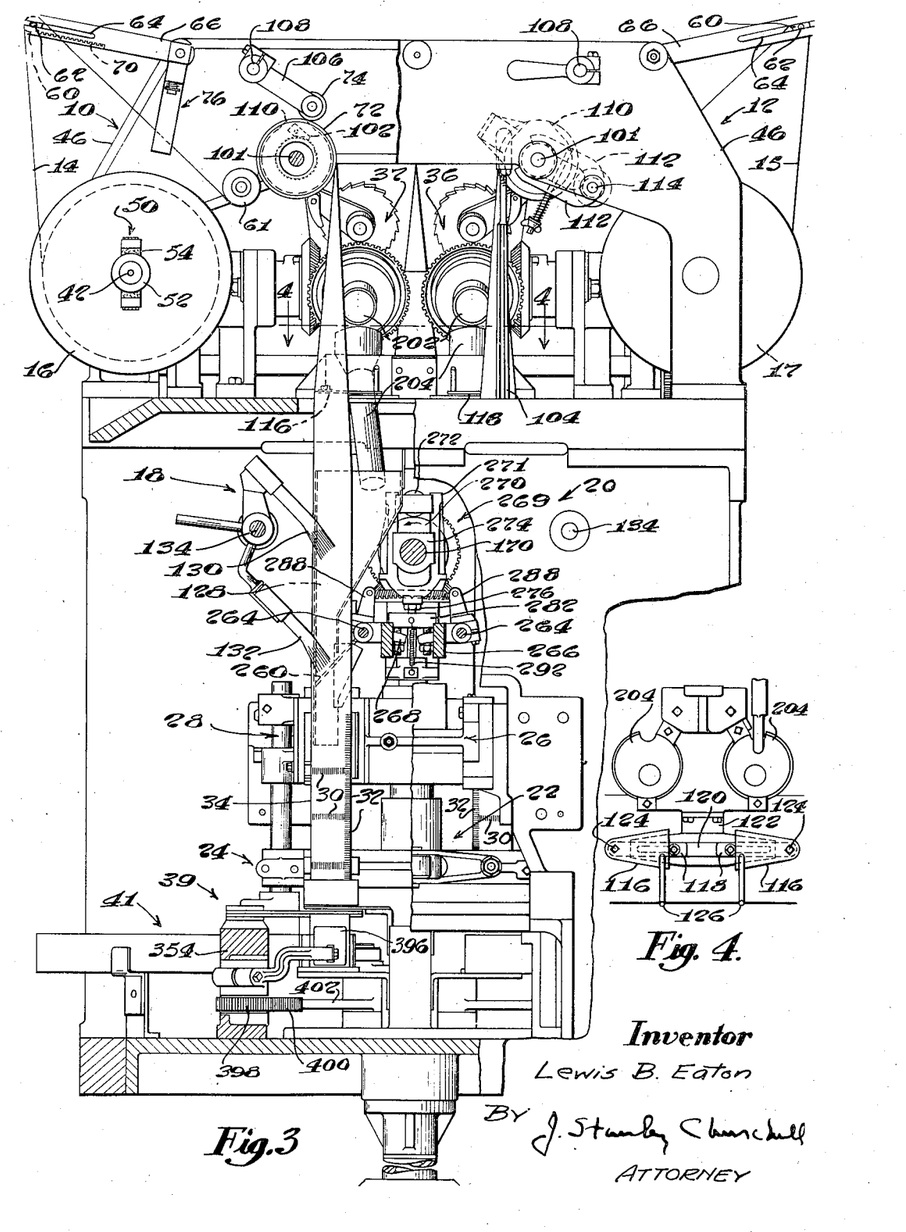
Fig. 3 is an enlarged side elevation partly in cross section of the machine shown in Fig. 1.
Fig. 4 is a plan view of preliminary strip forming members and tea guiding funnels as viewed from the line 4—4 of Fig. 3.

Referring now to the drawings, and particularly to Figs. 1 and 3, in general the present bag forming and filling machine is provided with a plurality of web withdrawing mechanisms herein shown as two such mechanisms, indicated generally at 10, 12, each of which is arranged to withdraw a predetermined length of bag forming material 14, 15 from supply rolls 16, 17 respectively thereof. The bag forming material preferably comprises a porous, fibrous material containing a thermoplastic, pressure-responsive binding material so that when two layers or plies of the material are brought together in face to face contact and subjected to the application of heat and pressure they will become and remain adhesively united. The webs of bag forming material 14, 15 are advanced past bag forming mechanisms, indicated generally at 18, 20, which operate to simultaneously fold each web longitudinally along a medial line to bring together the two half sections of each web preparatory to forming strips of connected bags. Each web of bag-forming material is preferably drawn over its respective bag-forming mechanism by a plurality and as herein shown by two gripping and advancing mechanisms indicated generally at 22, 24 operative to simultaneously advance each strip one bag length each cycle of operation of the machine and to present each strip in operative relation to bag sealing mechanisms 26, 28 arranged to simultaneously seal each strip along a transverse zone 30 and an adjacent longitudinal zone 32 during each sealing operation to form a strip of bag sections closed on one side by the folded edge 34 and heat-sealed along successive zones 30, 32. Upon sealing a bag section along the transverse and longitudinal zones, as above described, provision is made for introducing a predetermined amount of the commodity such as tea through the open edge of each web and between the folds of the partially formed bag sections. A plurality of bag filling mechanisms, indicated generally at 36, 37, are operative to deposit successive charges of the commodity into successive bag sections in timed relation to the operation of the strip-advancing and heat-sealing mechanisms, and, in the operation of the machine, the open top of a bag which has been provided with a charge of the commodity during one cycle of operation is closed during a succeeding cycle of operation. The heat-sealing and bag-filling mechanisms are preferably timed to operate to seal the bottom and side of each bag immediately prior to the operation of filling the bags. Thereupon each strip is intermittently advanced to one of a plurality of bag severing mechanisms indicated generally at 38, 39 which operates to simultaneously sever the strips through successive transverse sealed portions to form individual filled and sealed bags. The individual bags thus severed from the strips may be disposed in delivery chutes along which they are advanced in an upright position by transfer mechanisms indicated generally at 40, 41 operating in timed relation to the strip advancing means and the strip severing mechanisms, as will be hereinafter more fully described.

Provision is made in the present apparatus, for feeding the lengths of relatively fragile strips of bag forming material in a manner such as to reduce to a minimum the liability of tearing or rupturing the material during the operation of the machine. In the preferred embodiment of the invention, each web 14, 15, is withdrawn from its roll 16, 17 of bag forming material by web-withdrawing mechanism arranged to feed a length of the material in excess of that required to form one bag section. Simultaneously therewith or immediately thereafter, the portion of each web thus withdrawn from the roll is mechanically gripped and advanced by the gripping mechanisms 22, 24 a distance of one bag length past the shaping mechanism and into operative position to be heat sealed and to receive a charge of the tea or other commodity. Thus, during the web advancing cycle of operation of the machine, the portion of each web beyond the withdrawing mechanism and which is being drawn past the shaping mechanism is maintained in a relatively slack condition so that the strain or tension set up during withdrawal of the material from the roll, and, the strain exerted by the gripper mechanism in drawing the web past the shaping mechanism is separated or divided. Provision is also made in the preferred embodiment of the invention for drawing the web back to take up the slack therein, produced by such overdraft as described whereby to position the web in accurate relationship to the sealing members to form a bag section. Thus, the bag forming material is handled in the machine in a positive but gentle manner to produce accurately spaced bag sections with minimum liability of rupturing the fragile material.

As herein shown, see Figs. 1 and 3, the supply rolls 16, 17 each comprise a drum mounted to rotate upon similar shafts 42 supported in brackets 46 attached to the machine frame. Provision is preferably made for controlling the rotation of the drums to prevent inadvertent unwinding of the webs and for this purpose, as herein shown, a friction brake indicated generally at 50 is provided for each drum. Each friction brake 50 comprises a hub 52 formed integrally with the supply roll drum and brake shoes 54 supported in a bracket 56 and in frictional engagement with the hub 52. Adjusting screws 58 also supported in the brackets 56 are provided to engage the brake shoes 54 in order to adjust the pressure of the shoes against the hub.

In passing from the supply rolls 16, 17 to the web withdrawing mechanisms 10, 12, each web is drawn over a take-up roll 60 and under an idler guide roll 61. As best shown in Figs. 1 and 3, each take-up roller is rotatably mounted on a shaft 62 supported by and axially movable in slots 64 provided in brackets 66 extending from the machine frame. Each roller shaft 62 is provided with two gears 68, one at each end of the shaft, arranged to engage with gear racks 70, secured to the brackets 66 in order to maintain the shafts 62 parallel to the supply rolls and the feed rolls during its horizontal movement. Each roller 60 may be yieldingly urged in an outward direction to take up the slack in its web, as will be hereinafter described, and, in the operation of the machine, when the web is advanced between feed rollers 72, 74 to withdraw a length of the web, each take-up roller 60 is drawn inwardly against the tension of springs, not shown, so that when the withdrawing period is terminated the take-up rollers are in an advanced position in the slotted brackets; the webs being held taut by the frictionally held supply rollers 16, 17 and between the bight of the cooperating rollers 72, 74, one roller 74 of each unit being movable into and out of cooperating engagement with its respective roller 72.

Thereupon, in the operation of the machine, after the gripper mechanisms 22, 24 have operated to advance the webs one bag length, as above described, each movable roller 74 is rocked out of engagement with its roller 72 thereby releasing the web and permitting the take-up roller to retract under the influence of the springs to take up the slack in the web beyond the feed rollers whereby to compensate for any overdraft of the web by the feed rollers 72, 74. Thus, it will be seen that any overdraft which has taken place during the feeding operation for the purpose of maintaining the portions of the webs 14, 15 disposed in advance of the feed rollers in a slack condition to permit the web to readily shape itself about the forming members upon downward movement of the grippers, has retracted the amount of the overdraft so that the net advance will be one bag length. The webs are thus accurately positioned with respect to the bag sealing mechanisms whereby to produce bags of uniform length while at the same time providing for slackening of the web to relieve undue strain thereof during the web advancing operation.

Provision is also made for for maintaining the webs 14, 15 which extend between the take up rollers 60 and idler rollers 61 in proper alignment with their respective withdrawing rollers 72, 74 and for changing such alignment to accommodate the web folding mechanisms 18, 20 for folding the webs on a medial line. A yieldingly and adjustably mounted guide unit for each web, one of which is indicated generally at 76 may be provided for this purpose and, as shown in Figs. 2 and 3, each guide unit includes a pair of guide members 78, 80 one of which is provided with a tongue 82 arranged to fit in a groove 84 in the other to permit adjustment toward and from each other. The guide member 80 is riveted to a base member 86 and the guide member 78 is adjustably attached to the base member by a bolt 88 operative in a slot 90, in order to adjust the distance between the guides to conform to the width of the web. The base member 86 is yieldingly held to a frame member 92 by springs 94 provided on bolts 96 secured to the frame member 92 and operative in slots 98 in the base member. With this construction the position of the webs with relation to the feed rollers and their respective web folding mechanisms may be changed by manually and yieldingly moving the base member in one direction or the other, a handle 100 being provided for convenience in making such adjustments.

As illustrated in Figs. 1, 2, each web withdrawing mechanism comprises the driven roller 72, which may and preferably will comprise a cork faced roller, and, the cooperating idler roll 74. Each roller 72 is rotatably mounted upon a cross shaft 101 journaled in the machine frame and is arranged to be intermittently rotated to advance the web a predetermined length each cycle of operation through pawl and ratchet mechanisms indicated generally at 102. The ratchet of each unit 102 is secured to the hub of its respective roller 74 and the cooperating pawls are pivotally mounted in the pawl carriers, the latter being secured fast to their respective cross shafts 101. Each pawl carrier is arranged to be simultaneously rocked to perform the withdrawing and web advancing operation through connections including a link 104 the latter being connected to its respective vertically reciprocated gripper mechanism 22, 24 to be hereinafter described. Thus, in operation, the downward pull of the web and the withdrawing operation occur simultaneously although, as previously described, the amount of withdrawal is in excess of the amount required for a single bag length to produce the slack condition of the web, as desired. Suitable provision may and preferably will be provided to vary the amount of rotation of the roller 72 by adjustment of the pawl and ratchet mechanism whereby to vary the length of web withdrawn.

The cooperating idler rolls 74 are rotatably carried between arms 106 which are pivotally mounted upon cross shafts 108 extending between the frame members 46. During the feeding or withdrawing operation, the rollers 74 rest by their own weight against the webs in cooperating engagement with the driven cork faced rollers 72 to effect feeding of the webs therebetween. Provision is made for rocking the rollers 74 out of feeding engagement at the end of the feeding stroke so as to release the webs and to permit the slack to be taken up as above described. For this purpose, as herein shown, a pair of cams 110, arranged to rotate with the pawl carriers are provided which engage the ends of the rollers 74 at the end of the feeding stroke. In order to prevent the loosely mounted rollers 72 from being rotated in a reverse direction during the retraction of the pawl or during the take-up operation a pair of arms 112 pivotally mounted at 114 are arranged to engage a hub of each roller in yielding and frictional engagement therewith. In this manner, the relationship between the pawl and its ratchet, the latter being movable with the roller 72, is not disturbed so that a uniform length of the web may be withdrawn during each cycle of operation.

Referring now to Figs. 1, 3 and 4, during the downward pull upon the webs by the gripper mechanisms 22, 24, the webs are drawn past the forming mechanisms 18, 20 which, as herein shown, include preliminary forming members or guide plates 116. As best shown in Fig. 4 each guide plate 116 is substantially V-shaped and is arranged to engage its respective web along a medial line longitudinally thereof to cause the sides of the webs to be brought toward each other during the downward pull thereon. In order to permit adjustment of the guide plates with relation to their respective webs each plate is carried on an arm 118 adjustably secured in a groove 120 formed in a bracket 122 attached to the machine frame, so as to permit adjustment of the plates toward or from their respective webs. Each plate is also mounted to rock on a pivot 124 in the end of each arm 118 to permit angular adjustment of the plates with relation to the sides of the webs, a handle 126 being provided on each plate for convenience in making such adjustment. Each plate may and preferably will be frictionally held to its pivotal mounting to hold it in its adjusted position. By such angular adjustment of the plates with relation to their respective web sides the length of each side may be changed slightly to cause them to come together evenly and to be folded on a medial line, as described.

Figure 20:
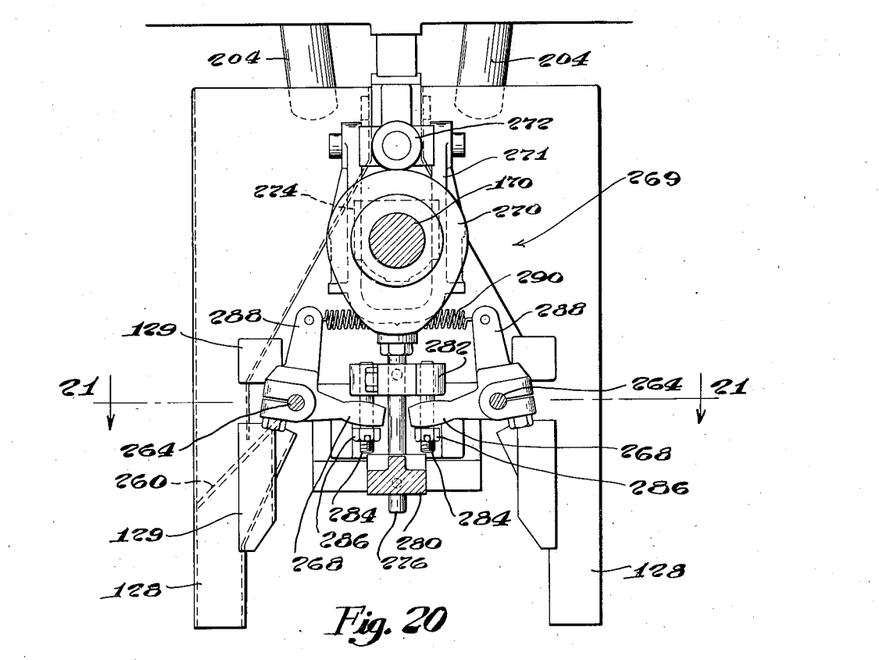
Fig. 20 is a side elevation of the tea releasing gates and operating mechanism therefor.
Figure 21:
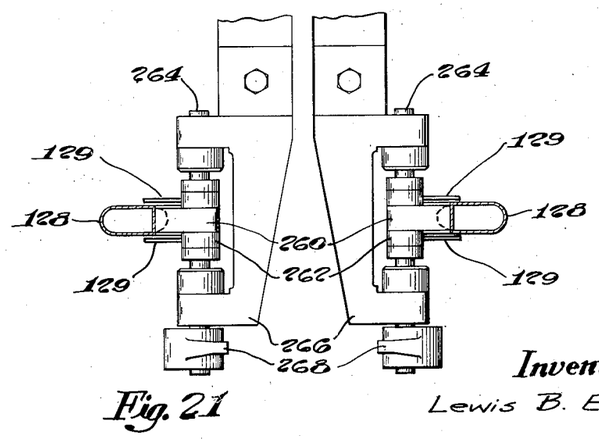
Fig. 21 is a plan view in cross section taken on the line 21—21 of Fig. 20.

After passing the preliminary forming members 116 the webs are engaged by stationary filling tubes 128 which form a part of the filling mechanisms 36, 37. Each filling tube 128 is substantially U-shaped in cross section, and, as each web is drawn downwardly its filling tube, in cooperation with stationary brushes 130, 132 effect folding of its respective web along its medial line in condition to be engaged by the sealing mechanisms 26, 28 to form the sealed containers. As best shown in Fig. 3, the brushes 130, 132 are adjustably supported from cross shafts 134. In practice, the filling tubes 128 preferably taper slightly in a downward longitudinal direction so that a cross section of each tube adjacent the lower brush 132 is thinner than the preceding section. Thus, the sides of each web are gradually brought together, the brushes acting to gently wipe the web about the tube and provide a minimum of frictional resistance whereby relatively fragile material may be handled with a minimum of strain upon the bag forming material. As illustrated in Figs. 20, 21, the longitudinal open edges of the strips formed about the filling tubes 128 may be guided between flat plates 129 attached to the sides of the tubes.

Figures 10, 11, 12, 13, 14:
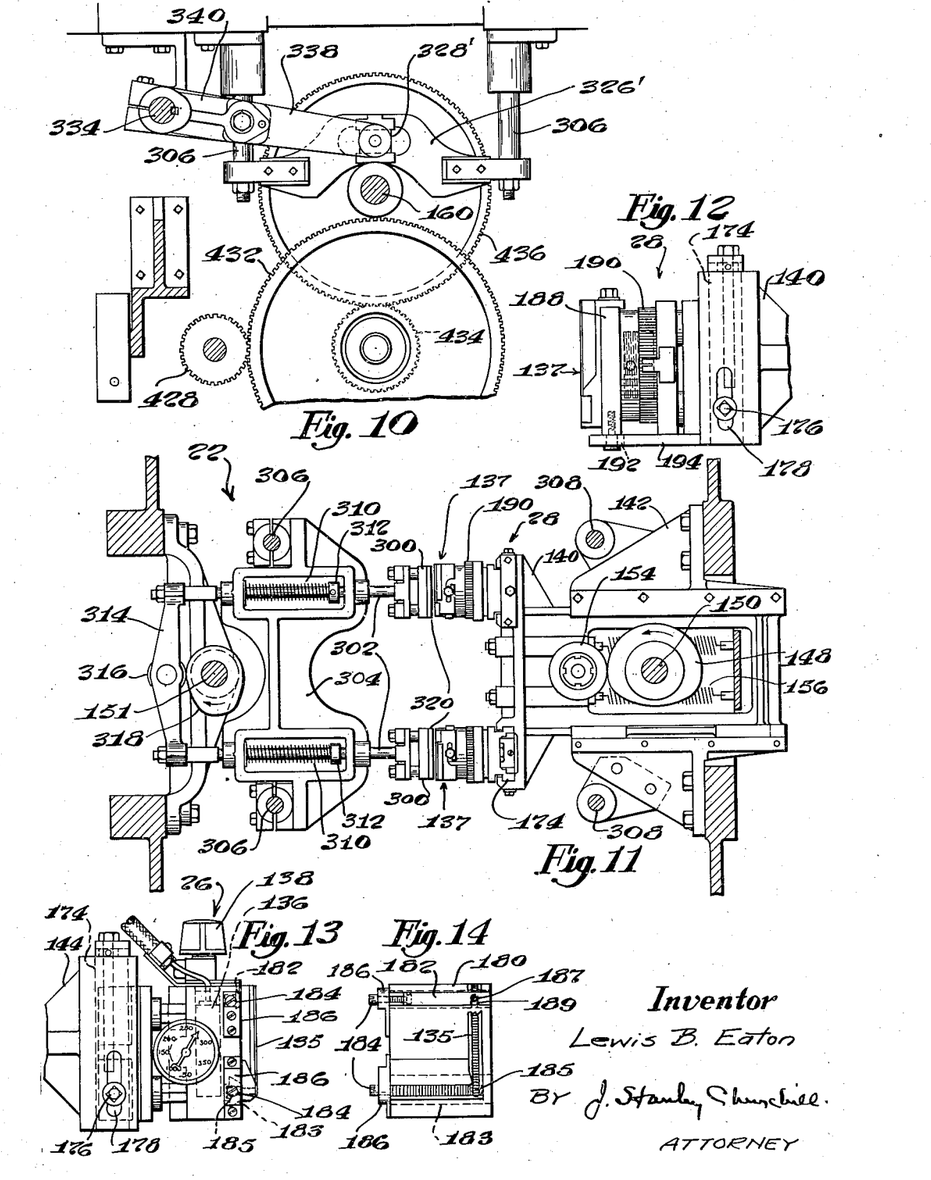
Fig. 10 is a similar view as viewed from the line 10—10 of Fig. 8.
Fig. 11 is a cross sectional plan view taken on the line 11—11 of Fig. 1 and illustrating one half of the paper gripping and advancing mechanism on one side, and, on the other side, illustrating one half of the sealing mechanism, it being understood that similar cooperating mechanisms are provided on each side.
Fig. 12 is a detail view in side elevation of one of the heat sealing members illustrated in Fig. 11.
Fig. 13 is a side elevation detail of one of the heat sealing members arranged to cooperate with that shown in Fig. 12.
Fig. 14 is a front elevation of the sealing member shown in Fig. 13.

Upon termination of the web advancing movements and after the slack has been taken up as above described, the webs are in position to be operated upon by the heat sealing mechanisms 26, 28, each of which, as best shown in Figs. 11, 12 and 13 comprises a pair of horizontally reciprocal, generally L-shaped sealing members 135, 137. One of each pair of sealing members, herein shown as 135, is preferably provided with electrical heating elements indicated generally at 136, the numeral 138 indicating a thermostat unit to control the temperature of the sealing member. The face of each of the heated sealing members 135 is preferably serrated, as indicated in Fig. 14. The cooperating sealing member 137 is not heated and may comprise a yieldable material, preferably of a rubberlike composition, against which the web is pressed during the sealing operation.

Referring now to Figs. 1 and 11 provision is made for effecting simultaneous operation of the sealing members 135, 137 to effect sealing of their respective webs, and, as herein shown, one of each pair of cooperating sealing members 137, is mounted in a horizontally reciprocal slide 140 operative in a stationary bracket 142 attached to the machine frame, and, the cooperating members 135, of each pair are similarly mounted in a slide member 144 operative in a bracket 146. The slides 140, 144 are arranged to be horizontally reciprocated by cams 148 mounted fast on vertical cam shafts 150, 151. As herein shown, each cam 148 cooperates with its respective roller 154 carried by each slide member 140, 144 to effect inward movement of the slides to bring the cooperative sealing members into sealing engagement with the folded webs, and, springs 156 are arranged to urge the slides in an outward direction to separate the sealing members. The vertical shafts 150, 151 are arranged to be rotated from the main cam shaft 160 by bevel gears 162, 164 to the vertical shaft 150, thence through bevel gears 166, 168 to a horizontal shaft 170 and finally through bevel gears 171, 172 to the vertical shaft 151, as clearly shown in Fig. 1.

As shown in Figs. 12 and 13, each sealing unit is attached to its respective reciprocatory slide 140, 144 by a tongue and groove connection 174 to permit vertical adjustment thereof by bolts 176 operative in slots 178 provided in the slides in order to effect vertical registration of opposing sealing elements. Provision is also made for permitting slight lateral and angular adjustment of the heated sealing members 135, in their supporting members. As best shown in Fig. 14, the L-shaped sealing members are supported in a block 180 provided with laterally movable members 182, 183 operative in grooves formed in the block and the members 182, 183 may be laterally adjusted in the grooves by adjusting screws 184 supported in bearing members 186. In order to provide angular adjustment, the sealing member 135 is pivoted at 185 in its movable supporting member 183, and the upper end of the sealing member 135 is provided with a pin 187 operating in a slotted portion 189 of the upper movable supporting member 182. Thus, in operation, by adjusting the screws 184 inwardly or outwardly the sealing member 135 may be moved laterally and angularly to effect registration with its cooperating sealing member 137.

Provision is also made in the preferred embodiment of the invention for adjusting the sealing pressure of the units 26, 28, and as best shown in Figs. 11 and 12, each supporting head 188 for the unheated sealing members 137 is arranged to be adjusted inwardly or outwardly by a knurled and threaded coupling member 190 cooperating with the supporting head. As herein shown, each head 188 is bolted through a slotted connection 192 to an extension 194 secured to the slide 140. In operation, rotation of the coupling member 190 effects extension or retraction of the sealing members and when the desired pressure is obtained the supporting heads may be secured in their adjusted position for most efficient sealing operation.

From the description thus far, it will be observed that the L-shaped sealing members effect sealing of the webs along transverse zones 30 and adjacent longitudinal zones 32, the latter comprising the open edges of the folded strips, and that the folded edges 34 close the opposite sides of the bag sections, leaving the edges of the strips open beyond the sealed portions and in communication with the open tops of the partially formed bag sections. Immediately upon engagement of the sealing members with the webs, or directly thereafter, provision is made for depositing a charge of the commodity such as tea between the open edges of the webs and into the partially formed bag sections. As herein shown, the forming and filling tubes 128 are arranged to receive a supply of the tea from the filling mechanisms 36, 37 and to release predetermined quantities of the tea into the partially formed bag sections, as indicated in Fig. 3.

Figures 5, 6, 7:
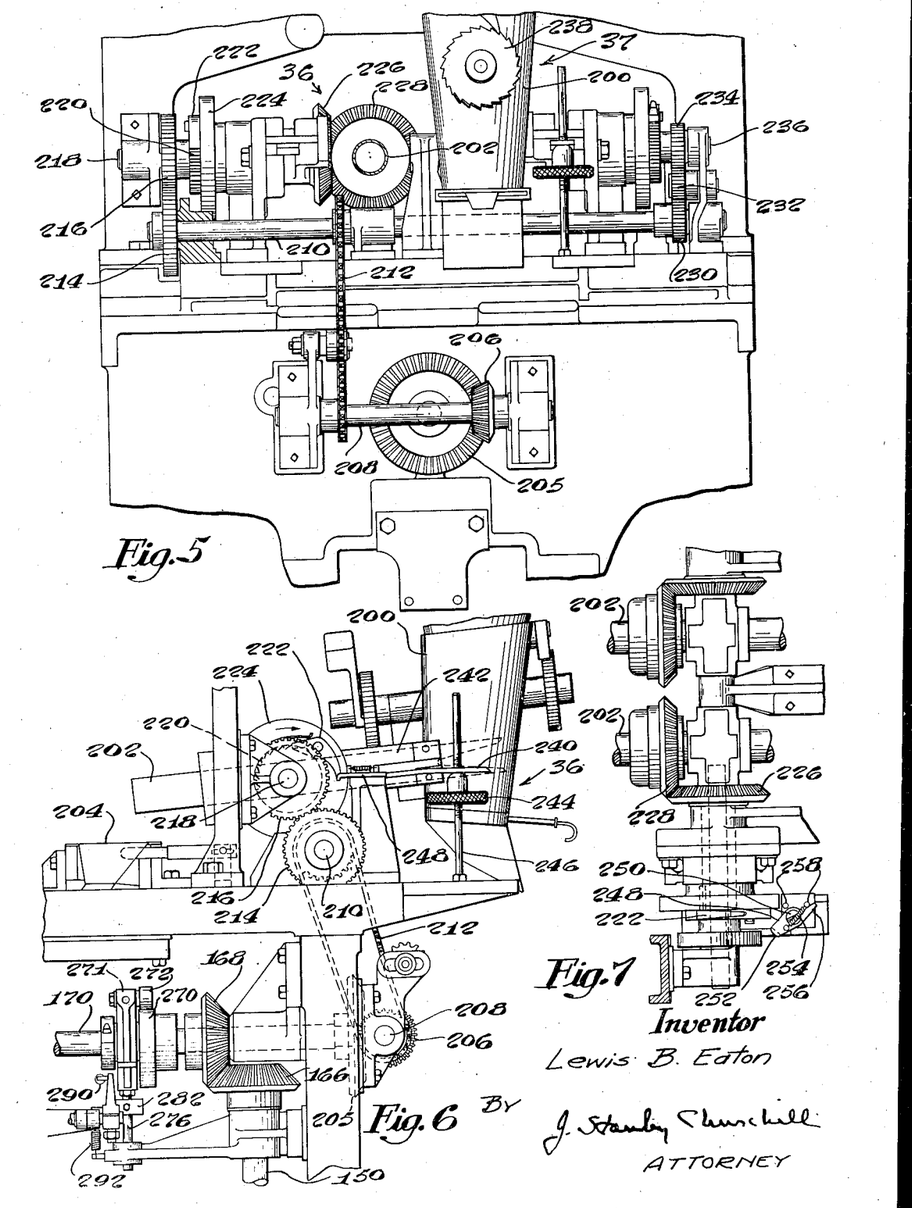
Fig. 5 is a partial side elevation of the drives to the tea feeding mechanisms.
Fig. 6 is a side elevation of the mechanism shown in Fig. 5.
Fig. 7 is a plan view of part of the driving mechanism illustrated in Fig. 5.

Referring now to Figs. 1, 3 and 5, the present tea filing mechanisms 36, 37 include supply hoppers 200 in which a supply of the tea is stored. Each supply hopper is provided with a rotary feeding tube 202 one end of which is arranged to be rotated within the supply hopper to effect withdrawal of a continuous uniform stream of the tea, and to deposit the stream into a guide funnel 204 which guides the tea into the forming and filling tube 128 of each filling unit. As herein shown, each feeding tube 202 is arranged to be rotated through connections from the horizontal shaft 170, the latter being provided with a bevel gear 205 at one end thereof cooperating with a pinion 206 fast on a horizontal shaft 208. The shaft 208 is connected to an intermediate shaft 210 by a chain and sprocket connection 212 to effect continuous rotation thereof. The bag-filling unit 36 is driven from the shaft 210 through cooperating spur gears 214 and 216 the latter being rotatably mounted on a shaft 218 and formed integrally with a ratchet 220. The ratchet 220 is arranged to cooperate with a spring-pressed pawl 222 pivotally mounted in a pawl carrier 224 fast on the shaft 218. The shaft 218 is also provided with a bevel gear 226 which meshes with a bevel gear 228 mounted on, and arranged to effect rotation of the feed tube 202 of the filling unit 36. The filling unit 37 is similarly driven from the shaft 210 through a gear train 230, 232 and 234 to obtain the desired change in direction of a corresponding shaft 236, which is provided with similar bevel gear connections to the corresponding feed tube 202. The supply hoppers are provided with the usual pawl and ratchet driven stirrers 238 for maintaining the tea in a loose and freely flowable condition, and which may be driven in any usual or preferred manner, not shown. As best shown in Fig. 6, the end of the tube 202 extending within the supply hopper is provided with an elongated, V-shaped slotted portion arranged to permit the tea to freely enter the tube and to effect a substantially uniform withdrawal therefrom. Provision is also made for adjusting the angular position of the tube 202 to effect the feeding of more or less tea, and as herein shown, an extension 240 from a pivotal bearing member 242 for the feeding tube 202 is arranged to be engaged by a knurled adjusting nut 244 carried on a vertical threaded rod 246.

In the preferred embodiment of the invention, provision is made for disengaging either one or both of the pawls 222 from their respective driving ratchets 220 so that one or the other tea-feeding mechanisms may be rendered inoperative as desired, such as, for example, when the supply of paper, or the supply of tea is depleted from one or the other side of the duplex mechanisms. For this purpose, each mechanism is provided with a manually operated pawl stop 248, one of which is shown in Fig. 7. The pawl stop 248 is pivotally mounted at 250 and is arranged to be rocked from an inoperative position, as shown in Fig. 7, to a position to present the pawl engaging end 252 of the stop into the path of the tail of the pawl 222, to thus effect disengagement thereof from its ratchet. A spring 254, connected to the pawl stop 248, is arranged to hold the same in the position to which it is moved. The pawl stop may be provided with a finger 256 for manually moving the stop, and suitable pins 258 may be provided against which the stop may rest when moved to one or the other of its positions.

In operation, the above described tea-feeding tubes 202 are arranged to effect a continuous uniform stream or flow of tea from the supply hopper into each forming and filling tube 128. In order to provide definite predetermined quantities or charges of tea for each bag section, each filling tube 128 is provided with an intermittently operated shutter or gate 260 at the lower end thereof which is arranged to release successive charges of tea into successive bag sections. As best shown in Figs. 3, 20 and 21, the shutters 260 of each filling tube 128 are arranged to be simultaneously operated to periodically release the accumulated charges of tea and to cut off the continuously flowing stream at predetermined intervals, through connections from the horizontal shaft 170. As herein shown, each shutter 260 is secured to a hub 262 fast on a rocker shaft 264, mounted in suitable bearings in a bracket 266 secured to the machine frame. One end of each shaft 264 is provided with an arm 268 fast thereon and arranged to be rocked to effect opening and closing of its respective shutter through engagement with the lower end of a vertically movable unit indicated generally at 269 arranged to be reciprocated by a cam 270 fast on the shaft 170. The upper end of the unit 269 comprises a U-shaped member 271 provided with a roller 272 cooperating with the cam 270. As herein shown, the U-shaped member 271 is supported for vertical reciprocation in a block 274 loosely mounted on the shaft 170 and slidingly engageable with the two arms of the U-shaped member 271. The lower end of the member 271 is provided with a rod 276 slidingly supported at its lower end in a bracket 280. The rod 276 is provided with a cross piece 282 having a stud 284 depending from either end thereof, each stud 284 being provided with a nut 286 at its lower end. As illustrated in Fig. 20, the arms 268 of each shutter extend between the cross piece 282 and its respective nut 286 so that in operation the cam 270 will effect simultaneous opening of the shutters 260 by engagement of the nuts 286 with the extended ends of the arms 268 when the reciprocatory unit 269 is elevated. Each arm 268 is further provided with an ear 288 connected by a common spring 290 which normally urges each shutter into its closed position when permitted to do so by the cam 270. A spring 292, as shown in Fig. 3, may also be provided to hold the roller 272 of the reciprocatory unit 269 against its cam.

From the description thus far it will be observed that in each cycle in the normal operation of the machine a plurality of partially formed bag sections sealed at their bottoms and on one of their sides, and, the bag sections are provided with charges of tea, leaving the upper transverse portion of each web open. Thereafter the webs are simultaneously advanced one bag length as above described whereupon a succeeding sealing operation closes the open sides of the preceding bags and partially forms new bags to be provided with charges of the commodity.

The mechanism 22, 24 for simultaneously advancing the strips one bag length will now be described. The gripping and advancing unit 22 is illustrated on the left hand side of Fig. 11, it being understood that a similar opposing unit 24 is provided to cooperate therewith to effect simultaneous advancement of the webs. Each unit carries two grippers 300 for cooperation with the opposing grippers of the unit 24, and, as herein shown, the grippers are mounted to be horizontally reciprocated into and out of engagement with the web and also, to be vertically reciprocated a distance of one bag length. The gripper members 300 of the unit 22 are horizontally supported upon individual rods 302 slidably carried in a symmetrical bracket 304 carried between and secured to a pair of vertically reciprocable rods 306, and, the grippers of the opposing unit 24 are similarly mounted, the supporting bracket being carried between and secured to a second pair of vertically reciprocal rods 308. Each rod 302 is provided with a coil spring 310 interposed between a portion of its supporting bracket and a collar 312 fixed to the rod which tends to urge the grippers inwardly into cooperating engagement with their opposing grippers and the bag forming strips. The rods 302 of each unit are joined at their outer ends by a tie piece 314, and each tie piece carries a roller 316 arranged to cooperate with elongated cams 318, secured to the vertical cam shafts 151, 150 respectively. Thus, in the operation of the machine the gripper members 300 of each unit 22, 24 are horizontally reciprocated simultaneously into and from engagement with the webs, the springs 310 effecting a yielding engagement therewith, and the cams 318, operating to positively separate the grippers. The grippers may and preferably will be provided with a relatively soft facing 320 such as of rubber or cloth, in order to gently engage the webs, and, as shown in Fig. 1, the upper portion of each gripper may be provided with an angular guide member 322.

Figure 8:
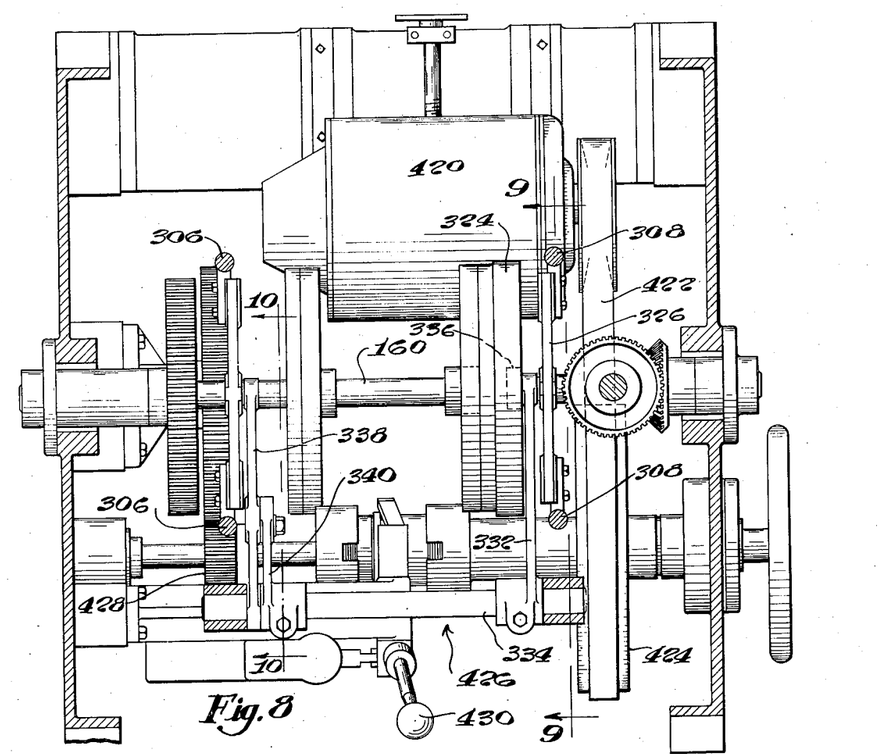
Fig. 8 is a plan view in cross section taken on the line 8—8 of Fig. 1 showing the cam shaft and main driving mechanism of the machine.
Figure 9:
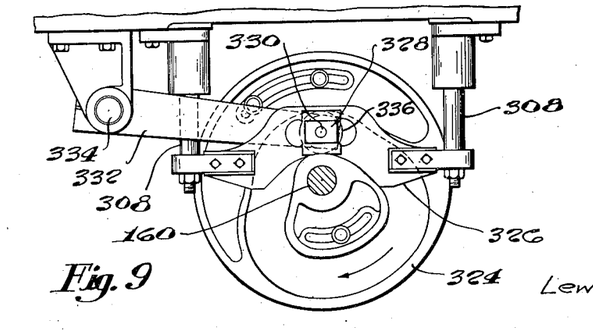
Fig. 9 is a side elevation of the cam shaft as viewed from the line 9—9 of Fig. 8.

Referring now to Fig. 8, each pair of vertical shafts 306, 308 between which the corresponding brackets 304 are supported are arranged to be vertically reciprocated so as to bodily move the gripping units one bag length and return, during each cycle of operation of the machine. As herein shown, both pairs of rods 306, 308 are arranged to be reciprocated by a single cam 324 secured to the main cam shaft 150. Each pair of rods 306, 308 are slidingly mounted for vertical reciprocation in suitable bearings provided in the machine frame and, as shown in Fig. 9 the ends of one pair of rods, herein shown as 308, are secured at their lower ends to a yoke-shaped tie piece 326 having a slotted central portion for engagement with a slide block 328 mounted on one end of a stud 330 carried in a lever 332 fast on a rocker shaft 334. The other end of the stud 330 is provided with a roller 336 cooperating with the cam 324. As seen in Fig. 10, the ends of the other pair of rods 306 are secured at their lower ends to a similar yoke-shaped tie piece 326' which is connected by a slide block 328' to an arm 338 adjustably secured to a lever 340 also fast on the rocker shaft 334. Thus, in operation, each pair of rods 306, 308 and the gripper supporting brackets carried therebetween are simultaneously operated to cause the two webs to be grasped at the transverse sealed areas of the connected bag sections immediately below the sealing mechanisms whereupon the strips are moved down one bag length. The grippers are then separated and returned to a position in alignment with the succeeding sealed portions in readiness to grasp the web for a succeeding cycle of operation. It will be observed that the cams 318, for effecting the horizontal movement are elongated so that the rollers 316 are in engagement with their respective cams during the vertically reciprocating movement above described.

As previously stated, the above described gripper mechanisms are operatively connected to their respective pawl and ratchet mechanisms 102 for rotating the withdrawing rollers 72 whereby to effect simultaneous withdrawal and advancement of each strip and, as herein shown, each link 104 is connected to a stud 103 extended from a clamp member 105 secured to the upper end of one of each pair of vertically reciprocable rods 306, 308.

Figure 15:
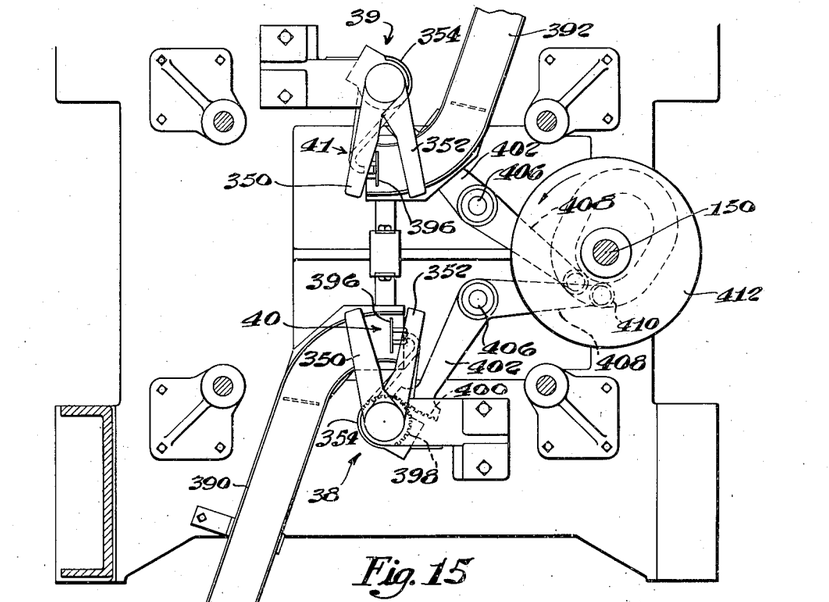
Fig. 15 is a plan view in cross section taken on the line 15—15 of Fig. 1 and illustrating the strip severing and bag discharging mechanisms.
Figures 16, 17:
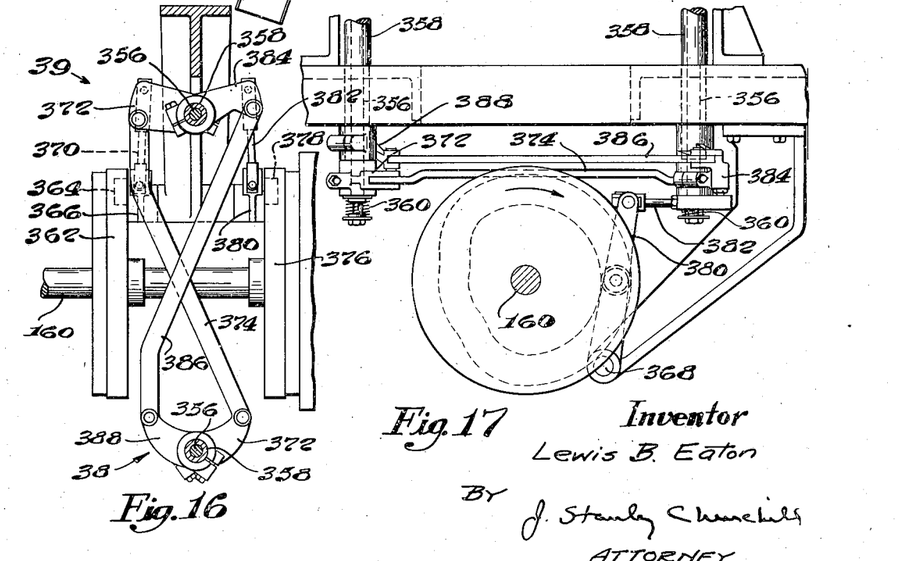
Fig. 16 is a detail plan view of parallel linkage for operating the severing mechanism shown in Fig. 15.
Fig. 17 is a side elevation of the same.

Referring now to Figs. 15, 16 and 17 each of the simultaneously operating strip severing mechanisms 38, 39, includes a pair of shears 350, 352 arranged to sever the endmost bag section from its respective strip to form an individual filled and sealed bag. In the operation of the machine, the strip advancing mechanisms operate to present the endmost bag sections into operative position with relation to the shears so as to effect severance of the strip through the connecting transverse sealed portion 30. Each shearing unit is mounted in similar bearing brackets 354 attached to the machine frame. The upper shear blade 350 of each unit is secured to the upper end of a central shaft 356 which is rotatably mounted in a sleeve or hollow shaft 358 in turn rotatably supported in the bearing bracket 354. The lower shear blade 352, mounted to cooperate with the upper blade, is secured to the upper end of the sleeve 358. A coil spring 360 provided at the lower end of each central shaft 356 is arranged to yieldingly maintain the upper shear in cooperative engagement with the lower shear of each severing unit 38, 39.

As illustrated in Figs. 16 and 17, the central shafts 356 of each unit, to which the upper shear blades 350 are attached, are arranged to be simultaneously oscillated by a cam 362 fast on the main cam shaft 160. A cooperating cam roll 364 carried by a lever 366, pivotally mounted on a cross shaft 368, is connected at its upper end by a link 370 to an arm 372 fast on the lower end of one of the shafts 356. As best shown in Fig. 16, the arm 372 is connected by a link 374 to a corresponding arm 372 fast on the lower end of the corresponding shaft 356. The sleeves 358 of each unit, to which the lower shear blades 352 are attached, are also arranged to be simultaneously oscillated by a second cam 376 fast on the main cam shaft 160. A cooperating cam roll 378 carried by a similar lever 380 also pivotally mounted on the cross shaft 368, is connected at its upper end by a link 382 to an arm 384 fast on the lower end of one of the sleeves 358. The arm 384 is connected by a link 386 to a corresponding arm 388 fast on the lower end of the corresponding sleeve 358. Thus, in the operation of the machine, successive endmost bag sections of each web are simultaneously severed from the strips as the latter are advanced by the gripper mechanism.

Figures 18, 19:
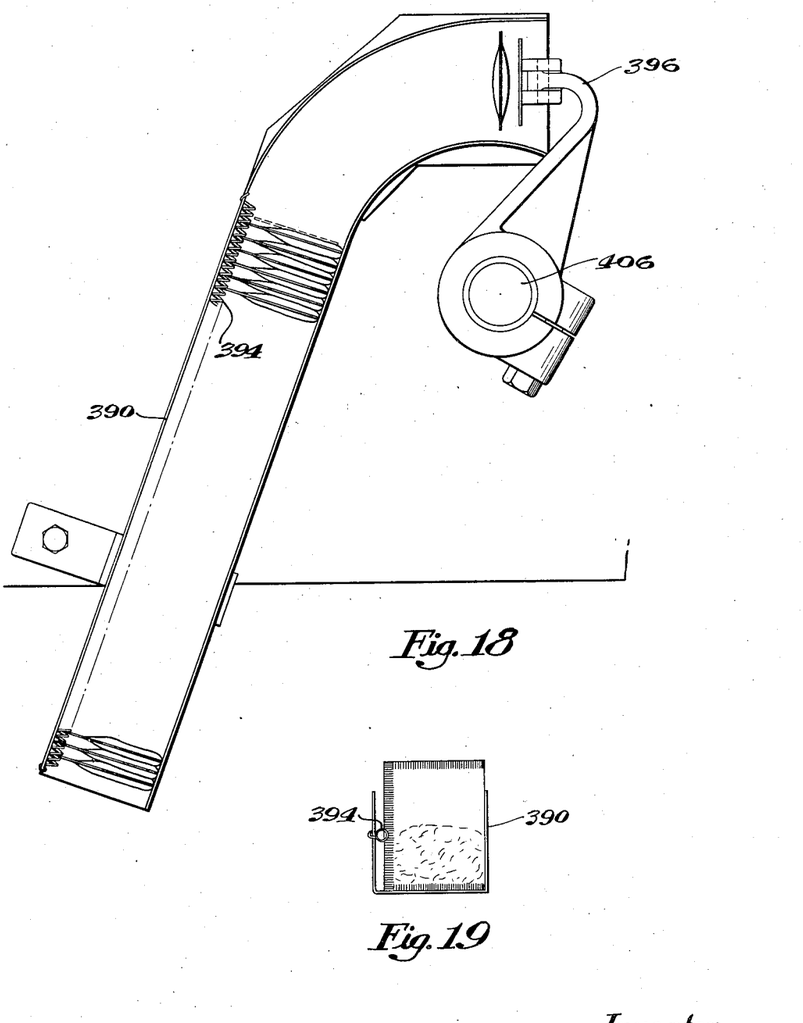
Fig. 18 is an enlarged plan of one of the discharge chutes.
Fig. 19 is an end view detail of the same.

During the strip advancing operation, each strip is brought to rest with its endmost bag section deposited in corresponding delivery chutes 390, 392 so that when the endmost bag sections are severed as above described, each individual bag is positioned upright in the receiving end of its chute. Immediately upon severance of the endmost bag sections, the bag transferring mechanisms 40, 41 operate to advance the bags from their severed positions, along their respective chutes, and into engagement with the previously severed bags which are stacked upright in the chutes for convenience in removing the finished bags from the chutes. As best shown in Figs. 18, 19, one side wall of each delivery chute, preferably the wall adjacent the "fin" or sealed edge of the upright bag section, is provided with an elongated and extended coil spring 394 arranged to engage said edges of the bags to effectively maintain the latter in an upright condition as they are moved along their respective chutes. As shown in Fig. 15, the delivery chutes 390, 392 are preferably arranged to guide the bags from corresponding strips to opposing sides of the machine.

As illustrated in Figs. 3 and 15 each transfer mechanism 40, 41 comprises a pusher arm 396 which is clamped to a gear 398 mounted for rotation about one or the other of the sleeve members 358 in the corresponding bearing brackets 354. The gears 398 are arranged to be rocked by segments 400 formed on the ends of similar arms 402 of two-armed levers pivotally mounted at 406. The second arm 408 of each two-armed lever is provided with a cam roll 410 cooperating with similar cams 412 fast on the vertical cam shaft 150, as shown in Figs. 1 and 15.

Referring now to Figs. 1, 8 and 10, the driving mechanism of the machine includes an electric motor 420 connected by a belt 422 to a pulley 424 forming part of a clutch mechanism indicated generally at 426 and arranged to be engaged to drive a gear 428 upon movement of the clutch handle 430. The gear 428 is arranged to drive the main cam shaft 160 through a gear train 432, 434 and 436, the latter being fast on the cam shaft.

While the preferred embodiment of the invention has been herein illustrated and described, it will be understood that the invention may be embodied in other forms within the scope of the following claims.

Having thus described the invention, what is claimed is:

1. In a tea bagging machine of the character described, in combination, web advancing and withdrawing mechanism adapted for simultaneous operation upon at least two strips of bag forming material, said mechanism including two pairs of cooperating horizontally and vertically movable grippers arranged to advance each strip one bag length each cycle of operation, means for supporting said grippers including two pairs of vertically movable rods, a bracket supported by and movable with each pair of vertical rods, means carried by each bracket for sliding movements thereon toward and from the other bracket, one of each pair of said grippers being mounted on each said means, an operating member engageable with each of said means to effect simultaneous movement of said means and grippers toward and from each other, and operating connections including a single cam arranged to effect simultaneous vertical reciprocation of said two pairs of rods.

2. In a tea bagging machine having means for vertically supporting and intermittently advancing two strips of folded bag forming material and two pairs of cooperating and simultaneously operating horizontally reciprocable sealing mem-